UNITED STATES PATENT OFFICE.

ROBERT DOUGLAS, OF ROCHESTER, NEW YORK.

JELLY-MAKING PRODUCT AND PROCESS FOR PRODUCING SAME.

1,235,666. Specification of Letters Patent. Patented Aug. 7, 1917.

Application filed April 12, 1915. Serial No. 20,690.

No Drawing.

*To all whom it may concern:*

Be it known that I, ROBERT DOUGLAS, of Rochester, in the county of Monroe and State of New York, have invented certain new and useful Improvements in Jelly-Making Products and Processes for Producing Same; and I do hereby declare the following to be a full, clear, and exact description of the same.

My present invention has for its object to provide as an article of manufacture a new food product intended to be used in making jellies, jams and marmalades which is capable for use domestically by the housewife, or in the more extensive manufacture of these substances for wholesale public distribution. More specifically my invention may be stated as having for its object the production of a pectous liquor which is suitably treated to remove therefrom the natural dissolved starch. To these and other ends the invention consists in certain improvements in the method of producing the improved food product as more fully appears hereinafter, the novel features thereof being pointed out in the claims at the end of the specification.

My invention, generally described, contemplates first, the rendering of jelly forming substances of fruits and vegetables in such a manner that they may be reduced into a concentrated liquid without hardening or jellifying and, second, to treat such concentrated pectous extract to render it substantially free from starch, the object in so doing being to obviate any tendency to cloudiness, or turbidity in a jelly product manufactured by the use of such pectous product.

Various fruits and vegetables, designated herein broadly as vegetable material, yield jelly forming substances, but apples, because of their cheapness and large content of pectose, are especially serviceable as a source from which my improved food product may be obtained. The treatment of this fruit to obtain the jelly forming substance in the first instance consists preferably in processing the fruit pulp to remove the saccharine juices, or natural sugar from the pulp after it has been crushed and squeezed to remove the fruit juices. If it is so desired the process of diffusion with water may be practised to remove from the fruit pulp the saccharine juices remaining therein. The fruit pulp thus prepared is subjected to the action of a suitable solvent, such as hot, or boiling water, containing a small proportion of any suitable acid. The addition of such acid is only used in comparatively small quantities, for the purpose of assisting in liberating the pectous properties of the fruit from its pulp, and its use is not always necessary, but depends largely upon the degree of ripeness of the fruit and its acidity. The treatment of the fruit pulp in the manner described furnishes a pectous liquor nearly free from natural sugar, the purpose of the removal of which is to supply a jelly forming product capable of being concentrated, or highly reduced in volume, without itself tending to become hardened or jellified. The reduction of the liquor to the desired density or to dryness is preferably accomplished by evaporating, *in vacuo*, the excess water. The concentrated substance thus obtained is employed in the manufacture of jellies, jams or marmalades, by mixing a given quantity thereof with a simple syrup of water and sugar in proper portions depending upon the degree of concentration of the pectous product.

The product obtained in the manner described above is admirably adapted for the purposes stated without further treatment, but I have found that the starch content in the concentrated liquid possesses an apparent affinity for the tannin constituents of the fruit, after the solution has been allowed to stand for any considerable period of time, which produces a cloudiness, or turbidity in such solution. Many clear jellies are made for the market consisting of fruit flavored syrup, and in the manufacture of such jellies the bulky starch precipitate described above might be objectionable in the higher grades of products, owing to the somewhat imperfect solubility of such discolored starch elements. The latter may be removed from the pectous extract, and the method which I preferably employ for accomplishing this object consists in treating the weak pectous liquor with a suitable starch converting enzym such as malt diastase in such a manner that the starch content in the liquor is converted into a sugar, or carbohydrate, such as maltose, or dextrose, which do not combine with the tannins of the fruit to form a precipitate. The liquor thus treated may be filtered for the purpose of completing the clarification and thereafter evaporated, to form a syrup of any desired viscosity, without any tendency being exhibited to form a precipitate.

By way of example in case malt extract is used for conversion, take one hundred pounds of fairly clear liquor as it comes from the filter press and cool to a temperature of about 135° Fahrenheit. Diffuse in this quantity of liquor the cold water extract from one pound powdered barley malt, or its equivalent in crushed green malt extract, and allow the reaction to proceed until a sample of the liquor after being filtered (bright) no longer gives a blue or purple reaction when tested with iodin solution when only a red or yellow color reaction is obtained by this test, the soluble starch has been converted. This conversion may be accomplished in one or two hours.

In connection with this operation it is pointed out that the character of the pectous liquor may vary so much according to the character of the apples, or vegetable material used that no absolute figures can be given that would be equally suitable in all cases, because the percentage of soluble starch present varies according to the ripeness of the fruit used; and for this and other reasons some pectous extracts will contain so little soluble starch that it may be removed with much smaller quantities than herein specified, or vice versa larger quantities may be required. The example given shows the treatment necessary for a liquid with an average starch content and having an acidity equal to two-tenths per cent. of malic acid, whereas another example may be cited in which the acidity is only fifteen-hundredths per cent. and which requires only one pound of malt for the conversion of five hundred pounds of pectous liquor, the lower acidity in the latter case facilitating the reaction. From this it will be seen that the amount of enzym extract necessary, is governed largely by the acidity of the liquor and when this is higher than two-tenths per cent. the pectous liquor should be diluted with water or more water used to cook the pulp. While a temperature of 135° Fahrenheit has been specified, it must be understood that every enzym has an optimum temperature at which it is most efficient in its converting power and therefore the temperature must be governed by the specific enzym used.

If desired all of the moisture may be removed and the pectous liquor reduced to a soluble powder which will contain without diminution all of the jelly forming properties possessed by the substance in its liquid form.

My invention provides a jelly forming substance which may be employed as a jellying agent in the production of many articles of food, and one which is especially adapted for use in the manufacture of clear jellies.

I claim as my invention:

1. A non-jellifying pectous concentrate substantially devoid of the natural soluble starch.

2. A pectous compound from which most of the natural sugar and soluble starch is removed.

3. A pectous concentrated compound from which most of the natural sugar and soluble starch is removed, and which is then reduced in volume.

4. A substantially starch free viscous concentrated liquid containing soluble pectins obtained from vegetable material having as an essential characteristic the property of forming a jelly when combined with definite proportions of sugar and water, and a further essential characteristic the lack of a cloudy precipitate.

5. The process of producing a pectous compound consisting in treating a vegetable material to remove the natural sugar therefrom, processing the remaining pulp in the presence of a solvent to extract the pectous substances, treating the pectous liquor to remove dissolved starch therefrom, and subsequently concentrating the liquor thus obtained.

6. A pectous compound from which the dissolved natural starch has been removed by its conversion into sugar by the action of a suitable diastatic enzym.

7. A pectous compound from which the natural soluble starch has been removed.

8. The process of treating vegetable material consisting in removing the natural sugar, digesting the remaining pulp in the presence of a solvent for the pectous substances and removing the starch from the pectous liquor so obtained.

9. The process of treating pectous liquors derived from vegetable material consisting in converting the free starch therein into a sugar or carbohydrate.

10. The process of treating pectous liquors derived from apples, or the like, consisting in converting the free starch therein into a sugar or carbohydrate, the conversion being effected by a diastatic enzym.

ROBERT DOUGLAS.

Witnesses:
G. WILLARD RICH,
RUSSELL B. GRIFFITH.